Jan. 7, 1964     JOHN R. OISHEI ET AL     3,116,510
WINDSHIELD WIPER
Filed May 20, 1963     3 Sheets-Sheet 1
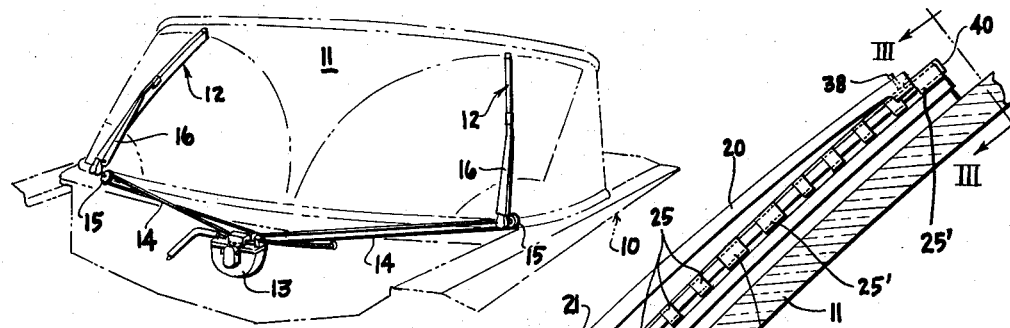
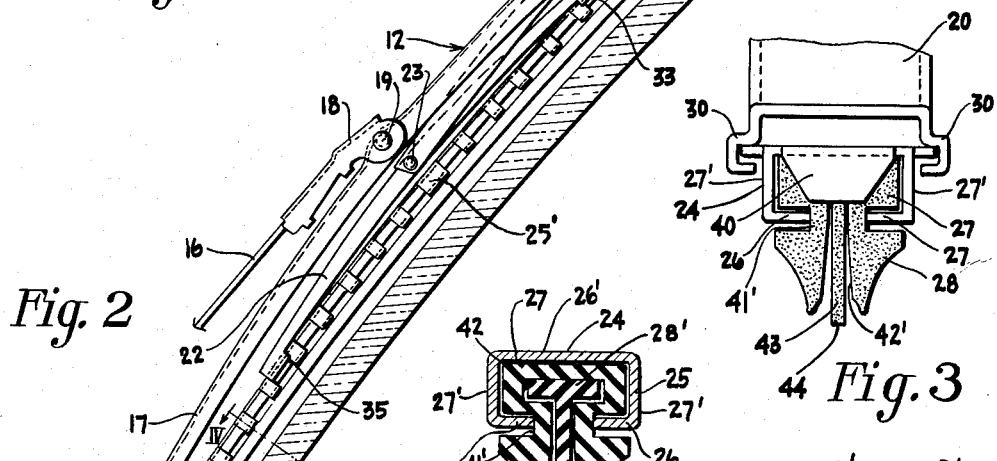
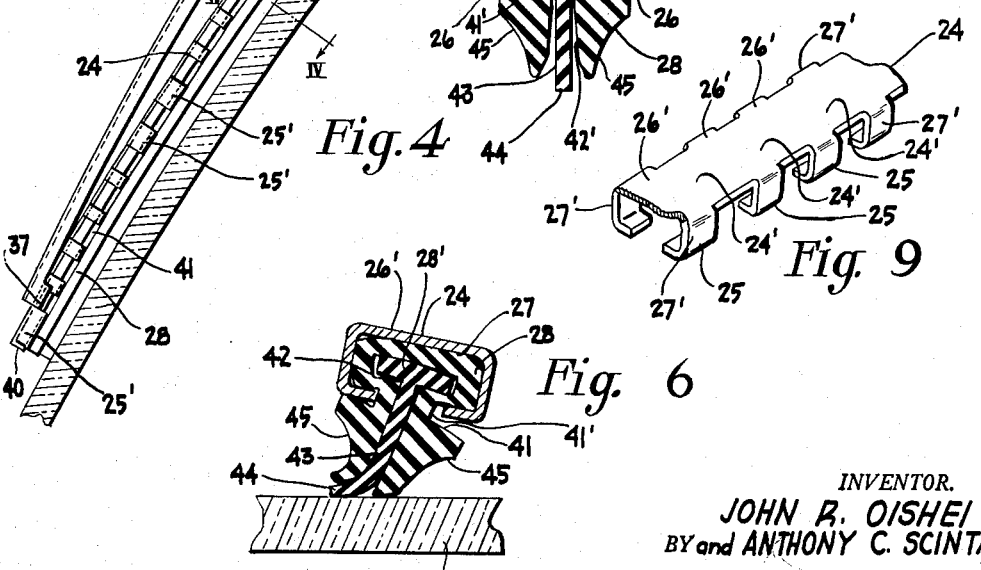
INVENTOR.
JOHN R. OISHEI
BY and ANTHONY C. SCINTA
Bean Brooks Buckley + Bean
ATTORNEYS Jan. 7, 1964   JOHN R. OISHEI ET AL   3,116,510
WINDSHIELD WIPER
Filed May 20, 1963   3 Sheets-Sheet 2
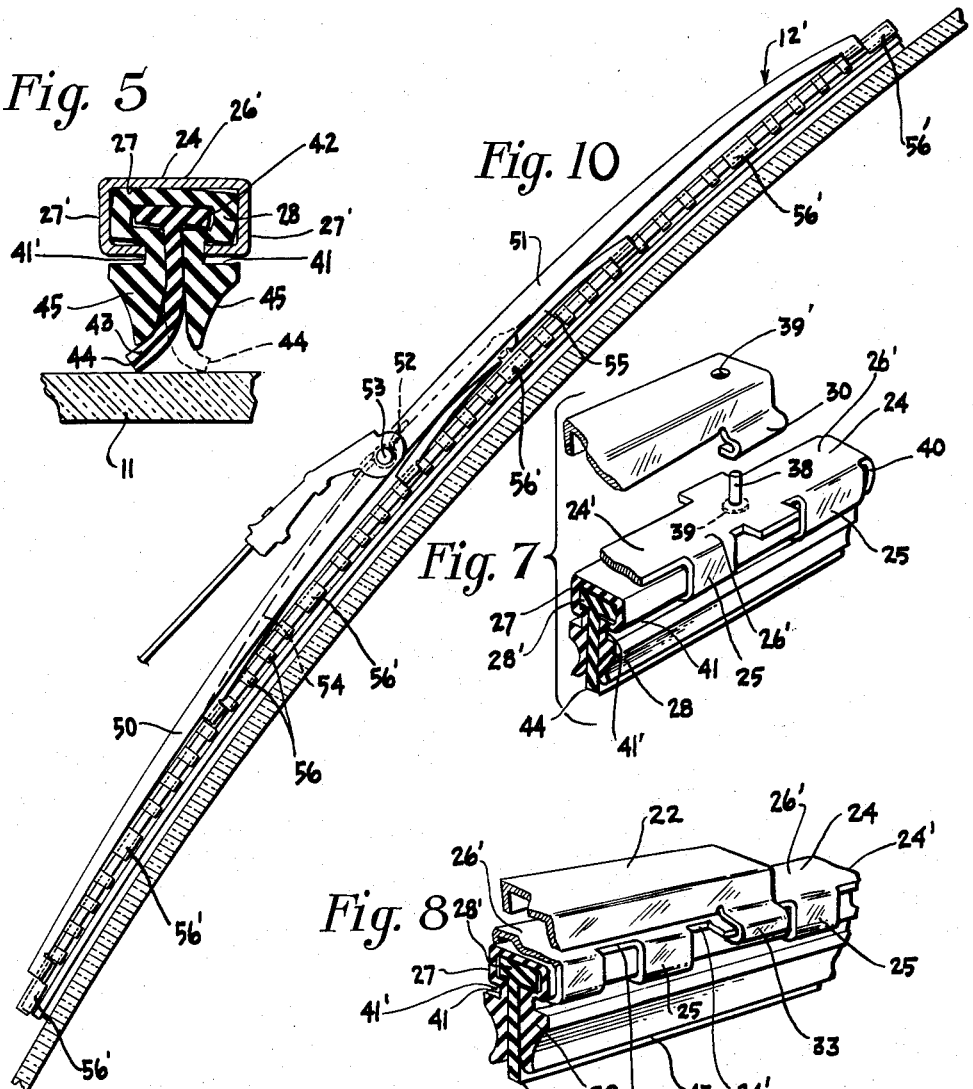
INVENTOR.
JOHN R. OISHEI
BY and ANTHONY C. SCINTA
Bean Brooks Buckley & Bean
ATTORNEYS

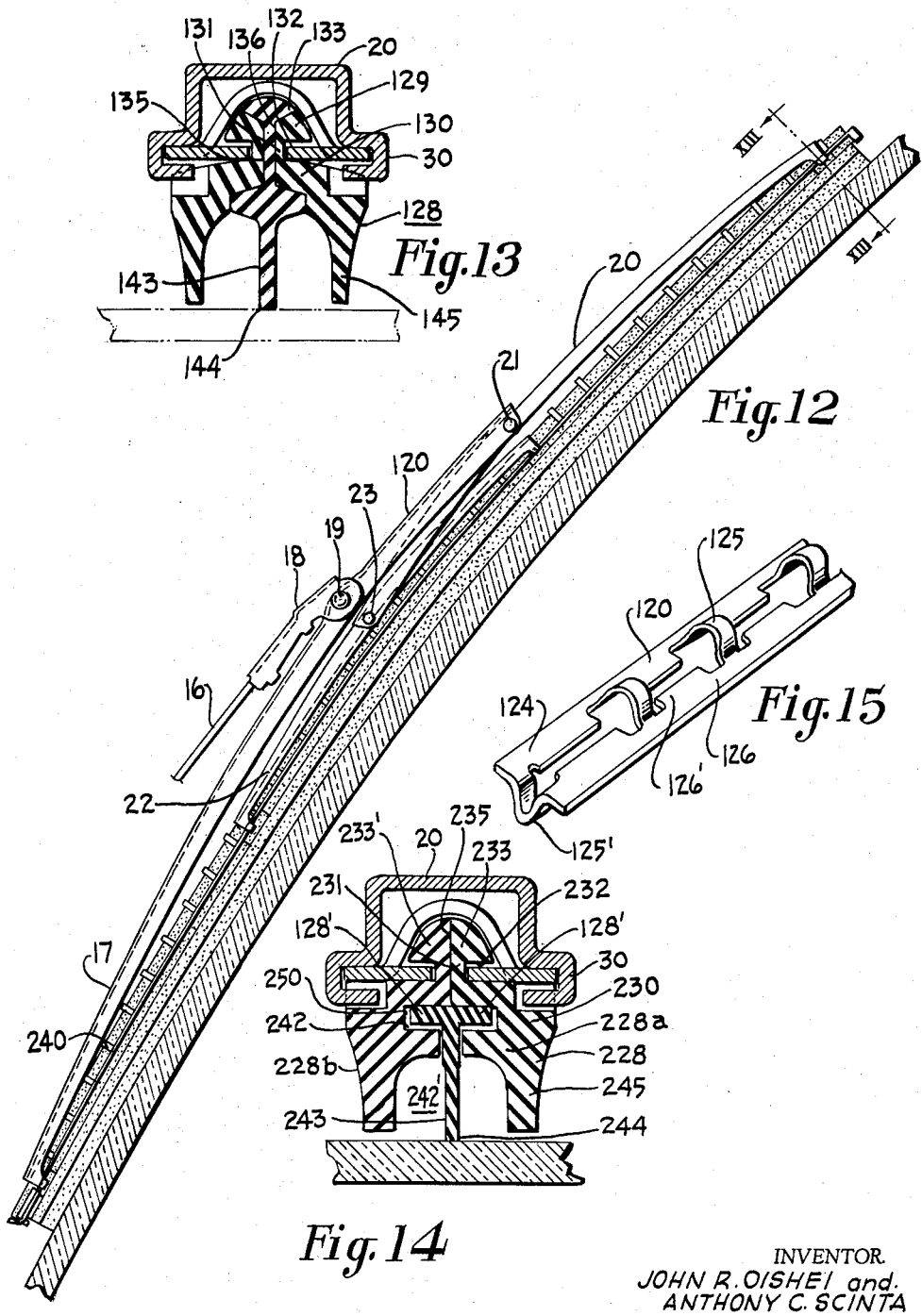

United States Patent Office 3,116,510
Patented Jan. 7, 1964

3,116,510
WINDSHIELD WIPER
John R. Oishei, Buffalo, and Anthony C. Scinta, Hamburg, N.Y., assignors to Trico Products Corporation, Buffalo, N.Y.
Filed May 20, 1963, Ser. No. 281,839
15 Claims. (Cl. 15—250.42)

The present invention relates to improved wipers including blade assemblies for use on contoured windshields of modern vehicles for maintenance of vision in rainy weather while driving into the face of heavy wind currents created during the higher speeds of car travel.

This application is a continuation in part of application Serial No. 9,362, filed February 17, 1960, now abandoned.

In the past, the speeds at which a vehicle could travel during rainy weather was limited by the phenomenon of "windlift" affecting the windshield wiper blade which caused the wiping blade to be lifted from the windshield thereby causing the wiper to become useless for removing the rain accumulation. One of the solutions so far offered to the foregoing problem has been to add more pressure to the already increased wiper arm pressure normally required to maintain the longer blades now being used in good wiping contact with the windshield. This added heavy arm pressure has imposed a requirement for more powerful and therefore more costly wiper motors. It is, inter alia, with overcoming the foregoing problem of windlift in the expedient manner that the present invention is concerned.

Accordingly, the primary object of the present invention is to provide an improved windshield wiper which obviates the lifting of the blade from the vehicle windshield by the wind when the vehicle is traveling at high speeds.

Another object of the present invention is to supply an improved wiper blade for a curved windshield which permits the use of an extremely flexible wiper blade to conform to areas of varying curvature on the windshield, to thereby provide improved wiping contact.

A further object of the present invention is to provide an improved windshield wiper blade which eliminates the monotonous metronome-like thumping noise at the point of blade reversal thereby assisting in producing a wiper system which is extremely quiet and smooth in operation.

A still further object of the present invention is to provide an improved wiper which will overcome the blade's tendency to cling when operating on a wet-dry or relatively dry windshield thereby tending to eliminate undesirable chatter of the wiper and also reducing the load on the wiper motor, especially when the latter is used with longer wipers operating under relatively heavy arm pressures.

Yet another object of the present invention is to provide an improved wiper which has an increased useful life because the wiping blade portion thereof is greatly protected against deterioration due to the effects of ozone and sunlight. Other objects and attendant advantages of the present invention will readily be perceived hereafter.

The windshield wiper which is capable of achieving the foregoing objects includes an articulated superstructure having multiple nested channel holders slidably mounted thereon for supporting a wiping blade. A first flexible metallic channel is supported by the superstructure. A second channel, preferably made of pliable which is moderately stiff and has a low coefficient of friction, is slidably mounted for free floating movement longitudinally within the first channel. This second channel is universally flexible and includes a recess or chamber portion. A soft rubber wiping blade element is mounted for free sliding movement within the recess of the universally flexible channel holder having a relatively low coefficient of friction. The wiping blade element is made of a rubber composition having a high coefficient of friction to provide optimum wiping and is of greater resiliency than the flexible channel member. The flexible channel has downwardly extending sides which serve plural functions; namely, as flex-limiting shoulders for the soft rubber blade element; as shields to prevent the force produced by the air flow across the windshield from lifting the lip of the blade element from the glass; and for lessening friction between the blade and the windshield when there is excessive layover, resulting in the sides contacting the windshield because of the lower coefficient of friction of the downwardly extending sides. The surface conforming engagement is further enhanced because the inner channel member can move relative to the outer channel member and because the blade element can move relative to the inner channel member.

The improved wiper of the present invention again achieves its objective of providing an increased useful life because the blade is protected by the inner channel against deterioration due to the effects of ozone and sunlight. The inner channel covering most of the rubber blade body is preferably moulded of ozone-resisting material. The protection of the more resilient rubber blade against the foregoing type of deterioration is especially significant when it is considered that this deterioration due to ozone and the sun's rays affects the life of the wiper whether it is in use or is parked, the latter condition constituting the larger proportion of the normal life of the wiper. The present invention will be more fully understood when the following portions of the specifications are read in conjunction with the accompanying drawings wherein:

FIG. 1 is a fragmentary perspective view of an automotive vehicle having a curved windshield and wipers mounted thereon;

FIG. 2 is an elevational view of the improved wiper of the present invention;

FIG. 3 is an end view of the wiper taken in the direction of the arrows III—III of FIG. 2;

FIG. 4 is a cross sectional veiw of the wiper taken along line IV—IV of FIG. 2 but showing the components thereof in their relaxed position;

FIG. 5 is a view similar to FIG. 4 but showing the position which the components of the wiper assume during normal wiping action;

FIG. 6 is a cross sectional view of the wiper but showing the position of the components thereof when it is running across a dry windshield;

FIG. 7 is an exploded view of the end of the wiper showing the manner in which the blade and its universal flexible inner channel holder and the combined rigid and flexible outer channel are held in assembled condition;

FIG. 8 is a perspective view showing the mountings between the wiper superstructure and the holder;

FIG. 9 is a perspective view of a channel consisting of a series of short box-like holder sections;

FIG. 10 is a view illustrating a wiper incorporating the principles of the present invention but having a different type of superstructure;

FIG. 11 is an alternate embodiment of the channel member shown in FIG. 9;

FIG. 12 is a side elevational view of a modification of the invention;

FIG. 13 is a cross sectional view of the modification shown in FIG. 12 taken on line XIII—XIII looking in the direction of the arrows;

FIG. 14 is a cross sectional view similar to FIG. 13 showing another modification of the invention; and FIG. 15 is a perspective view of a modified outer channel employed in the modification shown in FIGS. 12 through 14.

In FIG. 1 an automotive vehicle 10 is shown having a windshield 11 of the curved type mounted thereon in the conventional manner. Wipers 12 of the present invention are adapted to be driven by wiper motor 13 through flexible cable connections 14 extending between the motor and pulleys 15 mounted on the rockshafts, not numbered, which mount wiper arms 16 which, in turn, mount wipers 12.

Wiper 12 of the present invention includes an articulating lever superstructure for differentially dividing arm pressure. A primary lever 17 carries clip 18 which is pivotally mounted thereon by pin 19, clip 18 being adapted to receive and retain the end of wiper arm 16 in the well-known commercial manner. Primary lever 17 provides a 1-to-3 ratio of subdivision of arm pressure and the 1 is applied directly to the outer channel holder 24. A secondary lever 20 is pivotally mounted beneath the primary lever, as by pin 21, to receive pressure therefrom and to differentially apply pressure on a 1-to-2 ratio, and the 1 being applied to the outer channel holder 24. A single yoke 22 is mounted beneath the secondary lever, as by pin 23, to apply pressure on a 1-to-1 ratio, both applied to the channel holder 24. It will be appreciated that the pivotal movement of the levers 17 and 20 and the yoke 22 will permit the wiper to conform to the various areas of a curved windshield.

The wiper 12 includes an outer channel 24 having a series of short rigid box-like sections 25 supported in alignment with each other by flat interposed membrane structures 24' (FIG. 9), the membrane structures 24' permitting the series of short rigid box-like sections 25 to align themselves to conform to the contours of the curved surface. Each of the box-like channel sections 25 includes a top wall 26' (FIG. 9) oppositely positioned side walls 27' and a bottom wall 26 centrally slotted to thereby divide it into two separate shelf-like portions paralleling the surface of top wall 26'.

An inner channel 28, preferably made of pliable material which is moderately stiff and has a low coefficient of friction, is slidably mounted for free flowing movement longitudinally within the rigid box-like channel sections 25. The elongated inner blade holder channel 28 is universally flexible and comprises a relatively heavy top wall section 27 which provides an elongated, preferably rectangular, recess or chamber portion 42 therein. Inner channel 28 also includes a slotted opening 42' extending lengthwise of chamber 42. The outer side walls of the universally flexible channel holder 28 are preferably extended down from the top wall section 27 to provide skirt-like lateral supports or flex-limiting shoulders 45. A pair of outwardly opening opposed side slots 41 are also provided in channel 28. The inner faces of the side walls or flex-limiting shoulders 45 provide a continuation of the slotted opening 42' into the rectangular chamber 42 formed within the top wall 27 of the holder 28.

A wiping blade element 43 is mounted for free sliding movement within the universally flexible channel holder 28 and includes a cross head 28' and a narrower centrally suspended wiping lip 44 for contacting the surface of the windshield. The wiping blade 43 is made of a rubber composition having a high coefficient of friction to provide optimum wiping and is of a greater resiliency than the flexible channel member 28. Blade 43, by being supported throughout its length and breadth, is maintained in position for continuous wiping contact with the windshield surface. The downwardly extending sides or flex-limiting shoulders 45 of the flexible channel 28 serve a dual function; they both serve as supporters or flex-limiting shoulders for the blade element and also act as shields to prevent the force produced by the air flow across the windshield from lifting the lip 44 of the blade element 43 from the glass. This combined shielding and supporting action coupled with the free mounting of the blade element 43 in the flexible channel 28 provides the necessary support and permits the desired surface conformation for good wiping action, while also shielding the blade against being lifted by the wind currents.

Multiple outer rigid box sectioned channel 24 provides for slidably mounting U-shaped guides 30, 33, 35 and 37 extending from the outer ends of levers 17 and 20 and yoke 22 to permit relative endwise sliding motion between the levers 17, 20, and yoke 22 and the outer channel 24 as the blade element in its flexible channel holder 28 is urged into conformance with the windshield. This arrangement permits free assembly of the units into a composite unit and also permits ultimate easy detachment of the blade and its holder unit together with the sectioned box structure outer primary channel, to thereby permit simple replacement of these parts in the field.

In order to assemble outer channel 24 into the superstructure, it is slid into the superstructure so that each pair of U-shaped guides will engage the opposite margins of the outer channel 24 associated therewith. A pin 38 (FIG. 7) having a head 39 is inserted from underneath one of membrane portions 24' so that the inner channel 28 holds it in the position shown in FIG. 7 in an aperture (not numbered) in the outer channel 24. This pin 38 is adapted to extend through aperture 39 in lever 20 to hold the outer channel 24 in assembled condition with the superstructure. If disassembly is required, it is merely required to press pin 38 downwardly (FIG. 2) against the bias of the resilient inner channel 28, and by a relative sliding motion the outer channel 24 may be disengaged from the superstructure. Related structure is shown in U.S. Patent No. 2,649,605.

As noted above, the inner channel 28 consists of a rubber composition which is moderately stiff and has a relatively low coefficient of friction. In addition to being retained against excessive lateral movement within the metallic outer channel 24 by rigid box-like sections 25 surrounding heavy top wall section 27, endwise separation between the inner channel 28 and the outer channel 24 is prevented by the bent over ends 40 of the outer channel. The inner channel 28 has a small amount of endwise movement within the outer channel 24 because it does not extend through the entire length of the latter. Short rigid channel sections 25 are uniformly spaced from each other. However, at select points rigid box-like channel sections 25' are provided which are wider than sections 25. It is advantageous to modify the flexing characteristics of the outer channel 24 of longer wipers by the use of wider box-like channel sections 25' which provide increased rigidity, thereby providing increased control against the twisting tendency at the selective portions of the wiper where they are located. In other words, at the point where the wider box-like sections are located, the degree of flexing of the wiper is decreased.

Wiper blade 43 which is of generally T-shaped configuration is adapted to fit freely within inner channel 28. Blade 43 is fabricated of high friction rubber for providing a good wiping contact with the windshield. As can be seen from FIG. 5, during normal wiping action one corner of lip 44 engages the windshield and one of flex-limiting shoulders 45 supports the wiping blade 43. When the motion of the wiper is reversed, the other flex-limiting shoulder supports the blade 43. It is to be noted from FIG. 4 that there can be relative longitudinal sliding contact between blade 43 and inner channel 28. This relative longitudinal movement permits the wiping portion of the blade to adjust itself to the contour of the windshield to provide good wiping action. Furthermore, lip 44 has a considerable range of lateral movement between shoulders 45. It can thus be seen that the ability of the inner channel 28 to move relative to the outer channel 24, as described above, and the ability of the lip 44 of the wiping blade 43 to move both laterally and longitudinally relative to the inner channel 28 provides a great amount of freedom of movement of the elements of the wiping blade, to thereby permit the wiping lip 44 to conform to the windshield in an optimum manner.

In FIG. 6 the position which the wiper blade takes when it is running across a partly dry windshield is shown. The high friction of the lip 44 will cause the wiper to lay over to such an extent that the lower tip of flex-limiting shoulder 45 engages the windshield. Since the flex-limiting shoulder 45 has a lower friction characteristic than blade 43, the total friction force opposing movement of the wiper will be decreased when the flex-limiting shoulder engages the windshield, thereby obviating the "drag out" referred to above and preventing excessive loading of the wiper motor 13.

It is to be especially noted that rigid box-like channel sections 25 and 25' of outer channel 24 extend downwardly for a substantial percentage of the total height of the composite assembly of the outer channel 24, inner channel 28, and wiping blade 43. Furthermore, the bottom wall portions 26 of the box-like sections 25 extend a substantial distance inwardly from the side walls 27'. This arrangement provides lateral stability to the blade against excessive layover. Furthermore, the neck portion 41' of the inner channel 28 is relatively stout, and this characteristic further limits the amount of pivotal movement of the lower portions of the wiper about this neck portion. The foregoing structure provides high rigidity against deflection of the wiping blade element by wind currents. More specifically, box-like sections 25 with their bottom walls 26 impart rigidity to inner channel 28, and the flex-limiting shoulders 45 of inner channel 28 about the outer surfaces of blade 43. The combined resistance of the outer channel 24 and the flex-limiting shoulders 45 thus impart rigidity against lateral deflection to blade 43 to prevent lifting of the wiping blade by wind currents. It can be seen that a relatively small portion of the blade 43, which is unsupported, is exposed to the air stream and therefore there is less tendency for the air stream to lift this unsupported portion of the blade from the windshield. Furthermore, the trailing flex-limiting shoulder 45 shields the exposed portion of blade 43 from the upwardly moving high velocity air stream during upward movement of the wiper on the windshield; and the leading flex-limiting shoulder 45 (the one not in contact with the wiping rib) shields the wiping rib from the upwardly moving high velocity air stream during the downward travel of the wiper on the windshield. It can thus be seen that shoulders 45 serve the dual function of supporting the blade 43 during wiper travel and shielding it from the high velocity air stream incident to high vehicle speeds. The lower tips of shoulders 45 are close to the surface of the windshield to prevent a high turning couple from being exerted on the exposed portion of the blade. This closeness to the windshield may be permitted, because in the event of contact between these shoulders and the windshield, there will be no marring of the windshield because of the softness of channel 28.

It will further be noted that inner channel holder 28 encloses substantially the entire portion of the wiping element 43 and therefore protects the resilient rubber of this element from deterioration due to ozone and sunlight. Furthermore, as can be seen from FIGS. 3 and 4, whenever the blade is relaxed there is clearance between the inside surface 42' of the flex-limiting shoulders and the outside surfaces of the wiping blade 43. This clearance assists in obtaining desired wiping action.

In operation the windshield wiper of the present invention operates with extreme quiet because the thump which is usually heard at the ends of wiper travel is eliminated. More specifically, as can be seen from FIG. 5 the wiping lip 44 pivots at a point relatively close to the windshield at blade reversal. More specifically, flex-limiting shoulders 45 of inner holder 28 support the wiping lip 44 so that the major pivotal movement of the wiping edge of this blade is about a radius which lies between the surface of the windshield and the point of contact between bottom wall 26 of outer holder 24 and slots 41 of inner holder 28.

As can be seen from FIG. 5, when the wiper is moving to the right, blade 43 assumed the position shown in solid lines; however at reversal wiping lip 44 moves from its solid line position to its dotted line position. (The solid line designation to show the re-positioning of the remainder of the elements of the wiper has been omitted from FIG. 5 in the interest of clarity, it being understood that the solid line designations show the positions of the components of the wiper when wiping lip 44 is in its solid line position while moving to the right.) It can thus be seen that the radius about which the wiping edge of lip 44 pivots at reversal of blade movement is relatively short; that is, it is much shorter than would be experienced if the pivotal movement was about neck portion 41', as it is with conventional wiper structures. As explained above, the shortening of the radius of pivotal movement of the wiping edge of lip 44 limits the amount of flop-over at the end of wiper travel thereby obviating the metronome-like thumping which is experienced with other types of wipers.

In FIG. 10 a modified embodiment of the present invention is shown. The wiper 12' is similar in all respects to the wiper described above with respect to FIGS. 1-9. However, it differs therefrom only in the configuration of the superstructure, and in the spacing of the wider box-like channel sections, as described hereafter. More specifically, the superstructure of the wiper of FIG. 10 consists of levers 50 and 51 which are spring biased toward the windshield by spring 52 mounted about pin 53. Also mounted on pin 52 is a lever 54 which straddles the holder at one end and pivotally mounts yoke 55 at the other end. One of the ends of each of the levers 50, 51 and 54 and both of the ends of yoke 55 engage the outer channel of the wiper by means of mountings analagous to those described above with respect to FIGS. 1-9. The embodiment of FIG. 10 provides a holder of four spans rather than the three span embodiment of FIG. 2. It will further be noted that rigid box-like sections 56 are provided for engaging the inner channel 28, and at selective intervals wider box-like sections 56' are provided which are wider than box-like sections 56. The wider box-like sections 56' alter the flexing characteristics of the outer channel of FIG. 10 and therefore modify and tend to further control the twisting tendency of the outer channel.

In FIG. 11 an alternate form of outer channel is shown. This outer channel 60 is formed of flat strip stock and has side walls 61 extending downwardly in longitudinally staggered relationship. Each side wall 61 and half bottom wall 62 is joined to the successive opposite half by the flexible membrane 63 extending between side walls 61. The outer marginal edges 64 of holder 60 are intended to be slidably mounted by the U-shaped guides at the ends of the various articulated portions of the superstructure in a manner described above. Furthermore, a latch pin arrangement such as shown in FIG. 7 may be used to retain outer channel holder 60 in position on the articulated superstructure. The ends 65 (only one shown) of holder 60 are turned over to form prongs 66 and 67 which, in combination with the downwardly turned end portion 68, prevent an inner channel holder of the type discussed above and identified by numeral 28 from sliding out of engagement therewith.

In FIGS. 12 and 13 a modification of the invention is shown. The superstructure shown in FIG. 12 is identical in all respects to the superstructure of the wiper described with reference to FIG. 2 and differs from the wipers 12 and 12' only in the structure of the wiper element itself. Therefore, the superstructure will not be again described. It will, of course, be understood that the wiper element of this modification may be employed with either the superstructure shown in FIG. 2 or the superstructure shown in FIG. 10.

The wiper 120 comprises an outer holder or channel 124 of relatively rigid material formed to provide sufficient flexure to permit flexing in a plurality of planes whereby the wiper 120 can follow the contours of a curved windshield. The outer channel holder 124 is loosely retained by the claws of the superstructure to permit flexure in a multiplicity of planes. Mounted in the channel holder 124 is a flexible elongate multi-element channel blade holder 128 and mounted intermediate the confines of the flexible elongate channel 128 is a wiping blade 143.

The outer channel holder 124 is of the type shown in Patent No. 2,687,544 by A. C. Scinta, issued August 31, 1954, and comprises a pair of pressure receiving side bars or rails 126 and a plurality of connecting cross straps 125 joining the inner edges of the rails, but being upwardly arched to provide in effect an inverted channel support. With this arrangement the rails 126 are disposed laterally of the straps 125 for being embraced by the claws of the superstructure. Alternating with the cross straps 125 are pairs of opposed retaining fingers 126' which are carried by the side rails 126. The arching of the cross straps 125 imparts a channel form to the holder, but permits flexibility.

The elongate flexible inner channel holder 128 may be formed of elastomeric, rubber or rubber-like material, and may be, is desired, rigid relative to the wiping blade 143. This relative rigidity may be obtained by any suitable means as, for example, thickness of the material, increased density of the material, or it may be formed of an inherently more rigid material. The inner holder 128 is formed from two elongate sections. Each section includes an anchoring portion 129 along one longitudinal margin connected to a body portion 130 by a neck portion 131 forming a longitudinal recess 132 between the anchoring portion and the body portion on one side thereof. The anchoring portion 129, the body portion 130 and the neck portion 131 form a longitudinal planar surface on the side remote from the longitudinal recess 132. Depending from the body portion is a supporting shoulder or shield 145. Each of the elongate sections of the inner flexible blade holder 128 are identical and are disposed in side by side relation on opposite sides of the wiper blade 143.

The wiper blade 143 includes a wiping lip 144 along one longitudinal margin and an overhanging anchoring shoulder 133 along the opposite longitudinal margin. A second overhanging shoulder means 134 is disposed intermediate the wiping lip 144 and the first overhanging shoulder 133. A recess 135 is formed on each side of the wiper blade by the overhanging shoulders 133 and 134 which, in cross section, conforms in shape to the surface 136 formed on the side of each elongate flexible blade holder section opposite the longitudinal recess 132 formed by the anchoring portion 129, the neck portion 131, and the body portion 130. The surface 136 of each longitudinal section is received within the recess 135 in abutting relationship or in juxtaposition. When so disposed, the depending shoulders 145 are spaced apart on opposite sides of the lip portion 144 of the wiping blade 143.

Thus there is formed a wiping blade loosely received in interlocking engagement with a channeled flexible inner holder 128 and an outer elongate channeled holder 124 mounted in a wiper blade superstructure. The end straps 125' of the channeled outer holder 124 extend downwardly in a direction opposite the bridges 125 to limit longitudinal movement of the inner and outer elongate channel holders.

In FIG. 14 there is shown still another modification of the invention which utilizes superstructure identical to that shown in FIG. 12 and may be used in conjunction with any other suitable superstructure as, for example, the superstructure shown in FIG. 10. The outer channeled member 124 is identical with the channel holder 124 shown in the FIG. 13 modification and illustrated in more detail in FIG. 15. The inner channeled flexible holder 228 may be of any suitable elastomeric or other flexible material and may be formed relatively stiff with respect to the wiping blade 243. The flexible holder 228 is formed of identical elongate sections 228a and 228b. Each of sections 228a and 228b includes an anchoring portion 233 along one longitudinal margin connected to a body portion 230 by a neck portion 231, forming a longitudinal recess 232 on one side thereof and a planar surface 235 on the other side thereof. Each body portion 230 has depending therefrom a supporting shoulder 245. A recess 250 is formed in the body portion 230 and has its side walls parallel to the side walls of the recess 235. The elongate sections 228a and 228b are disposed in side by side abutting relationship with their planar surfaces 235 in juxtaposition, thereby forming an anchoring bead 233'. The anchoring bead 233' is received in the channel formed by the cross straps 125 and the side rails 126 and the retaining fingers 126' engage in the slots 232 on the elongate holders retained in place. The wiping blade element 243 is mounted for free sliding movement within the universally flexible inner channeled holder 228 and includes a cross head 228' and a narrower centrally suspended wiping lip 244 for contacting the surface of the windshield.

While preferred embodiments of the present invention have been disclosed, it will be readily understood that the present invention is not limited thereto, but may be otherwise embodied within the scope of the following claims.

What is claimed is:

1. In a windshield wiper for a contoured windshield, a wiper blade element mounted for relative longitudinal floating movement in a first flexible moderately stiff channel of rubbery material for independent wiping contact on a wet windshield, a second straddling outer channel member supporting said first channel while permitting relative longitudinal movement therebetween, U-shaped guide means for slidably mounting the outer channel means for the distribution of pressure from a wiping arm, said guide means being arranged to create three or more longitudinally extending flexible spans between said guide means, said first flexible channel having sides shielding said floating blade element from the wind, each of said sides acting to support said blade means to limit its lateral flexing on alternate strokes of the wiper, and means for mounting said wiper on a wiper carrying arm.

2. A curved windshield wiper comprising a wiping blade having a wiping lip on one longitudinal margin and an anchoring overhanging shoulder means on the opposite longitudinal margin, an elongate flexible moderately stiff blade holder formed with a longitudinal slot loosely receiving the wiping blade to permit relative longitudinal movement therebetween and interlocking with the shoulder means to form a universally flexible unit for shaping the wiping lip to the surface contour being wiped, a surface conforming support seating upon the holder and having retaining rigid channel sections straddling the holder and loosely interlocking therewith beneath the shoulder means to permit relative longitudinal movement therebetween, said holder having depending blade supporting shoulders on opposite sides of the wiping blade terminating short of the wiping lip for giving support thereto when the lip clings to the surface, and a pressure distributing superstructure supporting the surface conforming support.

3. A wiper for curved windshield comprising a wiping blade element having an elongated suspended body with one longitudinal margin serving as a wiping lip, the opposite longitudinal margin being provided with means for anchoring said blade, a distensible flexible blade holder having a longitudinally extending opening on one side for loosely receiving the blade lengthwise in interlocking engagement with said anchoring means to permit relative longitudinal movement therebetween, said blade element and holder element constituting a pliable unit each of different flexibility and each being conformable to permit surface contact by said blade element with a windshield to be wiped, and a primary channeled holder for loosely supporting the flexible distensible holder to permit relative longitudinal movement therebetween.

4. A windshield wiper comprising a straddling outer channel member having two parallel planar portions to interlock with a matching inner channel member having corresponding parallel planar portions, the inner channel being loosely mountable within the confines of the planar portions of the outer channel for relative longitudinal movement with respect thereto, a blade element having a head portion interlockable within the confines of said two channels, said blade element including a centrally disposed portion extending from its head portion, said centrally disposed portion being of greater depth than width, and said suspended portion of said blade extending beyond the confines of said channels for wiping contact with the windshield surface.

5. A curved windshield wiper comprising a wiping blade having a wiping lip on one longitudinal margin and an anchoring overhanging shoulder means on the opposite longitudinal margin, an elongate flexible blade holder formed with a longitudinal slot loosely receiving the wiping blade and interlocking with the shoulder means to form a flexible unit for permitting relative longitudinal movement therebetween and therefore shaping the wiping lip to the surface contour being wiped, and a surface conforming support seating upon the holder and having retaining rigid channel sections straddling the holder and loosely interlocking therewith beneath the shoulder means, said holder having depending blade supporting shoulders on opposite sides of the wiping blade terminating short of the wiping lip for giving support thereto when the lip clings to the surface.

6. A windshield wiper for a curved windshield comprising a superstructure, an outer holder mounted on said superstructure, an inner holder mounted on said outer holder for relative longitudinal movement with respect thereto, a flexible blade having a wiping lip with a wiping edge, anchoring means for loosely mounting said flexible blade on said inner holder for longitudinal movement relative thereto, a shoulder located on each side of said blade, said shoulders extending from said inner holder, each of said shoulders alternately supporting said blade in areas on said blade which are located between said anchoring means and said wiping lip, said shoulders also serving to shield the major portion of said blade from the force of the air stream encountered during high vehicle speeds but being located sufficiently distant from the windshield to permit contact of only said wiping lip with the windshield during wiper operation on a wet windshield, said shoulders contacting said windshield during wiper operation on a dry windshield to relieve the drag on said wiping lip when moving on said dry windshield.

7. A windshield wiper blade of multiple element construction for a curved windshield comprising a wiping element of flexible rubbery material for providing effective wiping contact with various portions of said curved windshield and having an edge portion for such contact supported and partially surrounded by a stiffer channel element of rubber material, means for loosely mounting said wiping element on said channel element to permit relative longitudinal movement therebetween as said wiping element conforms to various portions of said curved windshield, said channel element having an open channel facing toward the windshield in straddling position relative to the said edge portion, each side of said channel terminating close to said edge portion on each side thereof and each of said channel sides serving alternately as a shield to protect said edge portion from impingement of lateral wind currents while the other side by virtue of its greater stiffness than said edge portion gives partial support to said edge portion against lateral displacement while the blade is traversing the windshield in its wiping operation.

8. A windshield wiper for a curved windshield comprising a flexible elastic blade having one longitudinal margin serving as a wiping lip, flexible elastic holder means having spaced shield portions straddling the opposite longitudinal margin of the blade for selective engagement therewith, said shield portions extending short of the wiping lip for shielding the leading edge of said wiping lip from wind forces and being less flexible than said wiping lip to give firm support to the trailing edge of said wiping lip as the wiper is moved back and forth over a curved surface, and anchoring means formed between a portion of said flexible elastic blade remote from said wiping lip and said flexible elastic holder means for establishing the interlock between the elastic blade and the flexible elastic holder means to prevent separation therebetween while permitting relative longitudinal movement therebetween during the conforming action of said flexible elastic blade on various portions of said curved windshield.

9. An anti-windlift wiper for curved surfaces, comprising a resilient blade having one margin constituting a wiping lip, a channeled holder inverted over the opposite margin of the blade and providing blade straddling shield portions of greater stiffness for selective supporting contact therewith, said shield portions terminating short of the wiping edge, the walls of the holder channel being formed with shoulder means interlocking with shoulders means on the blade for preventing separation of said blade from said channeled holder while permitting relative longitudinal movement therebetween, and a flexible support grasping the inverted channel holder and acting to further maintain the interlock between the two shoulder means and to distribute a surface conforming pressure to the blade and channel.

10. A curved windshield wiper comprising a wiping blade having a wiping lip on one longitudinal margin and an anchoring overhanging shoulder means on the opposite longitudinal margin, an elongate flexible blade holder formed with a longitudinal slot loosely receiving the wiping blade and interlocking with the shoulder means to form a flexible unit for permitting relative longitudinal movement therebetween and therefore shaping the wiping lip to the surface contour being wiped, and a surface conforming support seating upon the holder and having retaining rigid channel sections straddling the holder and loosely interlocking therewith, said holder having depending blade supporting shoulders on opposite sides of the wiping blade terminating short of the wiping lip for giving support thereto when the lip clings to the surface.

11. A curved windshield wiper as claimed in claim 10 wherein said elongate flexible blade holder comprises a pair of elongate flexible sections, each having an achoring strip on one longitudinal margin remote from said supporting shoulder, said anchoring strips disposed in contiguous juxtaposition to form an anchoring bead.

12. A curved windshield wiper as claimed in claim 11 wherein said elongate flexible blade holder includes a body portion connected to said anchoring strip by an elongate neck portion of smaller width than said anchoring strip to form a shoulder between said anchoring strip and said neck portion extending longitudinally on the side of each elongate section remote from the juxtaposed sides of said elongate sections, said surface conforming support having inwardly extending flanges, said anchoring bead being disposed within the confines of said rigid channel with said flanges loosely interlocking with said shoulder.

13. A curved windshield wiper as claimed in claim 10 wherein said wiping blade includes a second overhanging shoulder means intermediate said wiping lip and said anchoring overhanging shoulder means, and wherein said elongate flexible blade holder comprises a pair of elongate flexible sections each comprising an anchoring strip on one longitudinal margin, a body portion intermediate said anchoring strip and said blade supporting shoulders and a neck portion of reduced width connecting said body portion and said anchoring strip, said wiping blade being disposed intermediate said pair of flexible elongate sections with said anchoring strips, said neck portion and said body portion of each of said flexible elongate sections abutting opposite sides of said wiping blade intermediate said overhanging shoulder means and said second overhanging shoulder means.

14. A windshield wiper for a contoured windshield comprising a wiping blade having a wiping lip on one longitudinal margin and an anchoring overhanging shoulder means on the opposite longitudinal margin, a multi element elongate flexible blade holder comprising a pair of elongate sections disposed in juxtaposition along a longitudinally extending marginal portion, said juxtaposed longitudinally extending marginal shoulders forming an anchoring bead, said elongate sections formed with opposing longitudinal slots loosely receiving the wiping blade and interlocking with the shoulder means to form a flexible unit for permitting relative longitudinal movement therebetween and therefor shaping the wiping lip to the surface contour being wiped, and a surface conforming support seating upon the holder and having retaining channel sections straddling the anchoring bead of said holder and loosely interlocking therewith, said holder having depending blade supporting shoulders on opposite sides of the wiping blade terminating short of the wiping lip for giving support thereto when the lip clings to the surface.

15. A windshield wiper for a contoured windshield comprising a wiping blade having a lip on one longitudinal margin and a longitudinally extending anchoring portion, said longitudinally extending anchoring portion comprising overhanging shoulder means along the longitudinal margin remote from said wiping lip and longitudinally extending overhanging shoulder means intermediate said wiping lip and said first overhanging shoulder means, said first and second overhanging shoulder means forming an elongate recess therebetween, a multi element flexible blade holder comprising a pair of elongate sections, each of said sections having a longitudinally extending marginal portion disposed in one of said longitudinally extending recesses, said first overhanging shoulder and said longitudinally extending portions forming an anchoring bead, a surface conforming support seating upon said anchoring bead and having retaining channel sections straddling said anchoring bead and loosely interlocking therewith beneath said first overhanging shoulder means, said holder having depending blade supporting shoulders on opposite sides of the wiping blade terminating short of the wiping lip for giving support thereto when the lip clings to the surface.

References Cited in the file of this patent

UNITED STATES PATENTS

| | | |
|---|---|---|
| 1,989,296 | Smulski | Jan. 29, 1935 |
| 2,006,322 | Horton | June 25, 1935 |
| 2,649,605 | Scinta et al. | Aug. 25, 1953 |
| 2,727,271 | Oishei et al. | Dec. 20, 1955 |

FOREIGN PATENTS

| | | |
|---|---|---|
| 594,842 | Great Britain | Nov. 20, 1947 |

UNITED STATES PATENT OFFICE
CERTIFICATE OF CORRECTION

Patent No. 3,116,510                 January 7, 1964

John R. Oishei et al.

It is hereby certified that error appears in the above numbered patent requiring correction and that the said Letters Patent should read as corrected below.

Column 1, line 29, for "the", first occurrence, read -- an --; line 66, after "pliable" insert -- material --; column 7, line 25, for "is" read -- if --.

Signed and sealed this 26th day of May 1964.

(SEAL)
Attest:

ERNEST W. SWIDER                 EDWARD J. BRENNER
Attesting Officer                 Commissioner of Patents